Oct. 16, 1951     A. G. REISKIN     2,571,485
MIRROR ARRANGEMENT FOR COMPACTS
Filed April 6, 1948
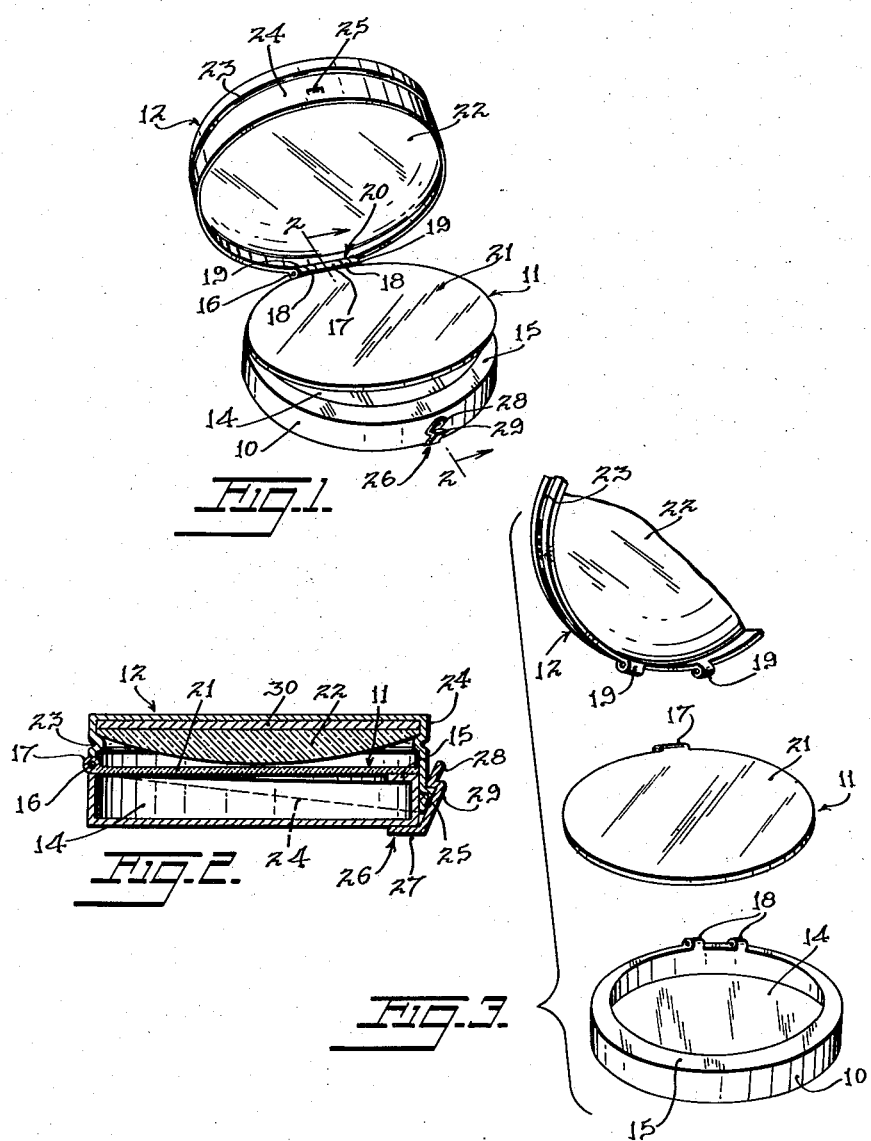
INVENTOR.
AUGUSTA G. REISKIN
BY
ATTORNEY

Patented Oct. 16, 1951

2,571,485

UNITED STATES PATENT OFFICE

2,571,485

MIRROR ARRANGEMENT FOR COMPACTS

Augusta G. Reiskin, Brooklyn, N. Y.

Application April 6, 1948, Serial No. 19,369

6 Claims. (Cl. 132—83)

This invention relates to new and useful improvements in mirrors provided in compacts and more particularly, the aim of the invention is to provide a novel and valuable mirror in compacts used for tweezing eyebrows or hair, and to treat the skin, also to facilitate facial make-ups meticulously and skillfully.

Another object of the invention is to provide a mirror in a compact characterized by the inclusion of a compartment, as one for containing such cosmetic articles as face powder and rouge, in combination with two parts each independently hingedly connected to the compartment, and each for individually serving a special purpose in connection with use of the material or materials in said compartment with, at the same time, both for cooperating to provide a closure for said compartment so secure that no powder whatever can escape from the compartment when the compact is closed.

Of said two hingedly connected parts, one is a part carrying a plane or non-magnifying mirror, and the other is a part carrying a reducing mirror. Preferably, a single multiplex hinge is employed for interconnecting said two mirror parts with a third part affording the compartment.

Because it is very simple and inexpensive, as a preferable element of an expedient to assist in attaining one of the purposes above noted, the part carrying the plane mirror may well be merely a sheet of thin metal suitably plated as with chromium and buffed and polished to a high index of reflection (although of course this mirror could be an ordinary glass sheet with an opaque backing and set in a framing carrier of metal, plastic or any other suitable material); the essence of such expedient being the provision of a uniplanar under surface for the plane mirror carrying part where it engages the top of the part affording the compartment when the compact is closed.

When the feature last mentioned is present, the reducing mirror can be so placed in the combination that it may be readily releasably latched to the part affording said compartment as the last step in closing the compact, in a way to bear down tightly on the underlying parts and so have the under surface of the part carrying the plane mirror close to the top of said compartment in an absolutely powder-tight manner, either due to the inherent resiliency of various of the parts already mentioned or through a specially added resilient means backing the reducing mirror and so functioning as to cause a slight downward squeeze to be imparted by the convex side of the reducing mirror, this side of said mirror lowermost when the compact is closed, against the central portion of the part carrying the plane mirror then interposed between the part affording the compartment and the part carrying the reducing mirror.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 shows a now favored embodiment of the invention in perspective, with the compact open, and with the part carrying the plane mirror somewhat above the part affording said compartment.

Fig. 2 is a transverse vertical section, taken approximately on the line 2—2 of Fig. 1, with the compact closed.

Fig. 3 is an exploded view, for showing the various hinge portions respectively carried by the three main parts of the compact.

Referring to the drawing more in detail, the said three main parts are, respectively, a lower cup 10, a plane mirror carrying part 11, and an upper inverted cup 12.

The interior of the cup 10 forms a compartment, 14, and said cup has an open top except for the flange next mentioned. Although not absolutely required, desirably the top of the cup 10 carries an internal horizontal narrow flange 15 partially running around the cup as shown. The flange 15, which may be integral with the main body of the cup, provided for the purpose of forming a special rest for the underside of the swinging end of the plane mirror carrying part 11 when the latter is swung down to close the top of the compartment 14, is centered opposite the hinge connection between the parts 10, 11 and 12.

In order to reliably hingedly connect the plane mirror carrying part 11, and to provide a particularly rugged connection between the two cups 10 and 12, said hinge connection is illustrated, most clearly in Fig. 3, to include, in addition to a single pintle 16 (Fig. 2), a single wide tab 17 on mirror 11 curled to embrace said pintle 16, two narrow tabs 18 carried by cup 10 each curled to embrace said pintle 16 beyond the ends of the curl 17, and two narrow tabs 19 carried by upper cup 12 each curled to embrace said pintle 16 beyond outer ends of the curls 18, so that the hinge connection when completed will be as seen in Fig. 1, where the same is as a whole marked 20.

The plane mirror part 11, which may be made of thin spring brass and suitably plated, is particularly treated at its upper side, to provide there a plane mirror 21 of high reflecting quality. The treatment just mentioned may be a chromium plating well buffed and polished.

Within the cup 12 there is a reducing mirror 22 suitably secured in said cup, as by springing said mirror at its plane rear side beyond an inwardly directed bead 23 running circumferentially around the side wall 24 of the cup 12. As will be noted, perhaps best from Fig. 2 when taken with the two other views, this side wall 24 gradually increases in height around both sides of the cup from the hinge 20 to the front portion of the compact. Therefore, while the side wall 24, where of maximum height, has to be brought down well below the top of the cup 10 when the compact is fully closed, the portion of said wall adjacent the hinge 20 is not of a height to interfere at all with easy swinging up of the cup 12 to the open position as in Fig. 1.

With the parts as in Fig. 1, application of facial make-up may be meticulously and skillfully done by reference to the plane mirror 21, and the overall appearance of the make-up to the normal human eye may be satisfactorily sedulously checked by reference to the reducing mirror 22.

Any suitable latch means may be provided to secure the parts together with the compact closed as in Fig. 2. An efficient latch means is shown, by way of example, as comprising a teat 25 formed on and outwardly projected from the front portion of the wall 24 of the cup 12, and a resilient strip 26, suitably secured to the cup 10 at the bottom of the latter and at the portion 27 of said strip. The strip 26, where the same continues upwardly beyond its said portion 27, is somewhat outwardly inclined to provide a free terminal length 28 positioned for convenient manual outward pull thereon, thereby releasing the latch engagement between the teat 25 and a projection 29 on the strip 26 effected when the cup 12 is snapped down fully over the cup 10.

The parts may be so shaped and arranged that during maintenance of said latch engagement, the convex side of the reducing mirror 22 presses down on the central portion of the part 11 gently yet with sufficient force to render said part 11 effective to close the compartment 14 in an absolutely powder-tight manner; and to improve this action there is interposed between the plane side of the mirror 22 and the inside of the cup 12 a pad 30 of some softly resilient material such as rubber.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a compact having a bottom, open-topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a reducing mirror movably positioned within the top cup and having a convex side facing and resting on the top surface of the flat part, and resilient means interposed between the adjacent faces of said mirror and the top wall of the top cup causing said mirror to bear resiliently against the top face of said flat part and retain said flat part in tight facial contact with said flange.

2. In a compact having a bottom, open-topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a reducing mirror movably positioned within the top cup and having a convex side facing and resting on the top face of the flat part, and resilient means interposed between the adjacent faces of said mirror and the top wall of the top cup causing said mirror to bear resiliently against the top face of said flat part and rettin said flat part in tight facial contact with said flange, said resilient means comprising a pad of soft resilient material interposed between said mirror and the top wall of the top cup.

3. In a compact having a bottom, open-topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a reducing mirror movably positioned within the top cup and having a convex side facing and resting on the top face of the flat part, and resilient means interposed between the adjacent faces of said mirror and the top wall of the top cup causing said mirror to bear resiliently against the top face of said flat part and retain said flat part in tight facial contact with said flange, and an inwardly directed bead formed on the top cup to be engaged by the convex face of said mirror for retaining the mirror against being forced out of the top cup in the open position of the cups.

4. In a compact having a bottom, open-topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a reducing mirror movably positioned within the top cup and having a convex side facing and resting on the top face of the flat part, and resilient means interposed between the adjacent faces of said mirror and the top wall of the top cup causing said mirror to bear resiliently against the top face of said flat part and retain said flat part in tight facial contact with said flange, said flat part having its side facing said mirror highly polished forming a flat mirror surface.

5. In a compact having a bottom, open topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a mirror movably positioned within the top cup and having one side arcuately shaped to face and rest on the top face of the flat part, and resilient means interposed between the adjacent faces of said mirror and the top wall of the top cup causing said mirror to bear resiliently against the top face of said flat part and retain said flat part in tight facial contact with said flange.

6. In a compact having a bottom, open topped cup and an inverted top cup having an open bottom pivotally connected to one another so that the top cup closes the open top of the bottom cup with its top wall spaced slightly above the open top of the bottom cup, an inwardly directed flange formed about the open top of the bottom cup, a flat part pivotally positioned between the cups to rest on the top face of said flange in the closed position of the cups, a mirror movably positioned within the top cup and having one side arcuately shaped to face and rest on the top face of the flat part, and resilient means interposed between the adjacent faces of said mirror and the top wall of the top cup causing said mirror to bear resiliently against the top face of said flat part and retain said flat part in tight facial contact with said flange, and means within the top cup retaining said mirror against being forced out of the top cup in the open position of the cups.

AUGUSTA G. REISKIN.

REFERENCES CITED

The following references are of record in the file of this patent:

UNITED STATES PATENTS

| Number | Name | Date |
| --- | --- | --- |
| 1,512,005 | Wright | Oct. 14, 1924 |
| 1,690,275 | Coryell | Nov. 6, 1928 |
| 1,841,933 | Bowers | Jan. 19, 1932 |
| 2,003,540 | Irelan | June 4, 1935 |
| 2,137,886 | Zell | Nov. 22, 1938 |
| 2,438,841 | Casalino | Mar. 30, 1948 |

FOREIGN PATENTS

| Number | Country | Date |
| --- | --- | --- |
| 193,544 | Great Britain | Mar. 1, 1923 |
| 535,922 | France | Feb. 2, 1922 |